P. FASSA.
COMPUTING MACHINE.
APPLICATION FILED NOV. 29, 1918.
1,293,392.
Patented Feb. 4, 1919.
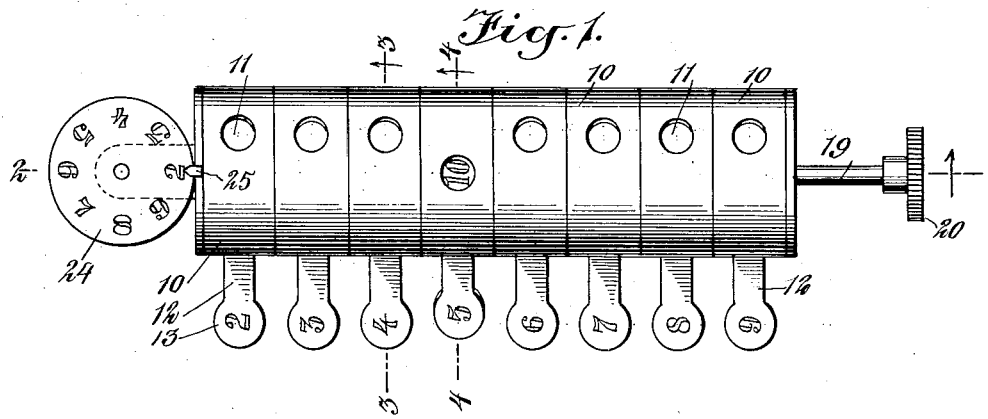
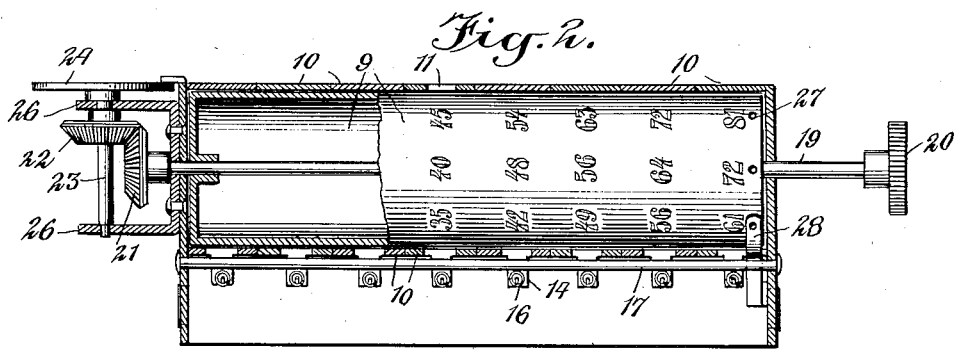
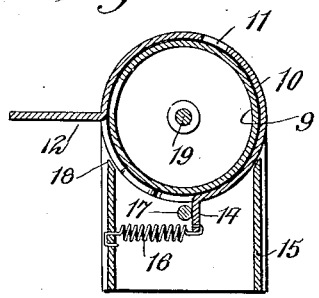
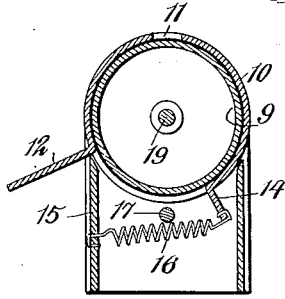
WITNESSES
INVENTOR
Peter Fassa
BY
ATTORNEYS

UNITED STATES PATENT OFFICE.

PETER FASSA, OF BROOKLYN, NEW YORK.

COMPUTING-MACHINE.

1,293,392.  Specification of Letters Patent.  Patented Feb. 4, 1919.

Application filed November 29, 1918. Serial No. 264,677.

*To all whom it may concern:*

Be it known that I, PETER FASSA, a citizen of the United States, and a resident of the city of New York, borough of Brooklyn, in the county of Kings and State of New York, have invented a new and Improved Computing-Machine, of which the following is a full, clear, and exact description.

Among the principal objects which the present invention has in view are: to ascertain rapidly the mathematical result of multiplication of one number by another; to provide a machine for assisting educational institutions in the training of students; and to simplify the construction and cheapen the cost of machines of the character mentioned.

*Drawings.*

Figure 1 is a top plan view of a machine constructed and arranged in accordance with the present invention;

Fig. 2 is a longitudinal vertical section of the same, the section being taken as on the line 2—2 in Fig. 1;

Fig. 3 is a vertical cross section of the same, the section being taken as on the line 3—3 in Fig. 1;

Fig. 4 is a vertical cross section, the section being taken as on the line 4—4 in Fig. 1.

*Description.*

In its present form the invention has for its principal object to assist in the education of scholars in the primary grades of schools, and is employed especially in disclosing the result of the multiplication of any of the digits, excepting "1", by other digits with the same exception. With this object in view, a cylinder 9 has imprinted thereon in circular arrangement and in serial and successive order, the results of the multiplication of the successive digits by each of the digits, the results being serially and successively disposed. The digit "1" is omitted in the present examples of multiplication, the cylinder 9 being divided by the imprints referred to into eight circles equally spaced. In practice, the cylinder 9 is covered by a series of circular shields 10, said shields being slidably mounted on the cylinder 9, and each having a peep-hole 11, through which may be seen one of the imprints of the cylinder 9, when the various shields are moved to the full positions thereof.

The handles 12 are provided, one being attached to each of the said shields to enable the movement of the said shields to expose one of the imprints as indicated. Each handle 12 has a tab 13. The various tabs 13 are imprinted successively with the digits beginning with "2" and ending with "9". Normally the shields 10 are held in retracted position where the imprints referred to are not shown. To this end, each of the shields 10 has a lug 14, which extends within the case-like base 15, and to which is attached a pull spring 16. As shown best in Figs. 3 and 4 of the drawings, the springs 16 are attached to one of the sides of the base 15, and operate when not restrained to hold the lugs 14 against the stop bar 17.

From the foregoing it will be seen that an operator by depressing any one of the tabs 13, selecting the tab by the imprint thereon, may expose one of the imprints alined with the shield 10 associated with the selected tab. The movement of the shields 10 is limited by the edge 18 of the front member of the case 15.

The imprint which may be exposed when any particular shield is operated depends upon the disposition of the cylinder 9. The cylinder 9 is rigidly attached to a rotary shaft 19. At the ends of the shaft 19, are a milled nut 20 and a bevel gear wheel 21. The bevel gear wheel 21 operatively engages a second bevel gear wheel 22, which is rigidly mounted on a vertical shaft 23. At the upper and exposed end of the shaft 23 is an index disk 24. The gear wheels 21 and 22 are so proportioned that the disk 24 is synchronized in its movement with the cylinder 9, so that said disk is revolved as the cylinder 9 is completely rotated. A series of numerals ranging from "2" to "9," inclusive, is imprinted on the exposed surface of said disk in juxtaposed relation to the perimeter thereof. The arrangement of said numerals is such that they are successively disposed in proximation to the pointer as the lines of numerals on the cylinder 9 are disposed in position to be viewed through the peep-holes 11, when the shields 10 have been shifted to the view station as described and as shown in Figs. 1 and 4 of the drawings. The disk 24 and shaft 23 thereof are rotatively mounted in bearings formed in the brackets 26. It is obvious that the cylinder 9 and shields 10 may be constructed from any suitable material, not limited to metal.

It is preferred that the case 15, gear wheels, shaft, and operating parts should be constructed of metal, as these are the parts of the machine which receive what is known as the wear and tear of operation.

The plan of operation for the machine is as follows: The operator desiring to ascertain the result of two multiplied by five, grasps the nut 20 and turns the shaft 19 and parts connected therewith, until the numeral "2" on the disk 24 stands in indicated relation to the pointer 25. He then places his finger on the handle 12 having the tab imprinted with the numeral "5," which is the multiplier of the example. Depressing the handle 12 until the shield 10 with which it is associated is arrested in its movement by engaging the edge 18 of the side of the case 15, it will be found that the peep-hole 11 of the shield which has been moved, will expose the numeral "10" of the numerals which are imprinted on the cylinder 9, which numeral "10" is the product of the example. As the numerals imprinted on the cylinder 9 are the results of successive multiplications of the digits on the handles of the shields 10 with which the particular series is associated, it is evident that as the disk 24 is rotated progressively, the results of the multiplication are maintained in proper synchronism. Thus when the disk 24 is moved, as shown in Fig. 1, to select the numeral "2," all of the numerals on the cylinder 9 in line with the numeral "2," will be the results of multiplying by the numeral "2," the various digits indicated on the tabs 13.

It is optional after adjusting the disk 24, to shift any of the shields 10 to expose the result of the multiplication of "2" by any of the selected numbers.

It is obvious that if desired, the mechanism may be extended to handle larger sums than here indicated. As stated above, the present object of the invention is to aid in the educational process of scholars in the primary grades.

As seen in Fig. 2 of the drawings, the cylinder 9 is furnished with a series of indents 27, which are engaged successively by a spring detent 28. The indents 27 and detent 28 are so placed to arrest the cylinder 9 in the service position where if any of the handles 12 are depressed, the peep holes 11 associated therewith are brought opposite the numerals in line with the pointer 25.

Claims.

1. A machine as characterized comprising a cylinder having imprinted thereon a plurality of numbers, said numbers being arranged in series, the numbers of each series being arithmetically related, the lowest numbers of the various series being raised above the lowest number of the preceding series by the quantity "2;" means for covering said cylinder, said means providing a plurality of peep holes adapted for disposition to expose one of the numbers of one of said series; and means for selecting the power of the number to be viewed.

2. A machine as characterized comprising a cylinder having imprinted thereon a plurality of numbers circularly arranged and arithmetically progressively related, the lowest number of each series being successively increased by the quantity "2"; a series of shields rotatively mounted on said cylinder for forming covers for said series, said shields having each a peep hole formed therein; and means for manually moving said shields to dispose said peep holes in lines parallel with the axis of said cylinder.

3. A machine as characterized comprising a cylinder having imprinted thereon a plurality of numbers circularly arranged and arithmetically progressively related, the lowest number of each series being successively increased by the quantity "2"; a series of shields rotatively mounted on said cylinder for forming covers for said series, said shields having each a peep hole formed therein; and means for manually moving said shields to dispose said peep holes in lines parallel with the axis of said cylinder, said means embodying a series of handles mounted on said shields and having digits imprinted thereon, said digits being arranged from two up successively and progressively.

PETER FASSA.